US008582729B2

(12) United States Patent
Minear

(10) Patent No.: US 8,582,729 B2
(45) Date of Patent: Nov. 12, 2013

(54) SYSTEM AND METHOD OF CONTROLLING A GRAPHICAL USER INTERFACE AT A WIRELESS DEVICE

(75) Inventor: Brian Minear, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1499 days.

(21) Appl. No.: 11/361,275

(22) Filed: Feb. 24, 2006

(65) Prior Publication Data

US 2007/0204228 A1 Aug. 30, 2007

(51) Int. Cl.
*H04M 11/00* (2006.01)
*H04M 1/24* (2006.01)

(52) U.S. Cl.
USPC .......................................... 379/88.18; 379/11

(58) Field of Classification Search
USPC ............ 379/88.18, 88.13, 235, 281; 704/275, 704/235
See application file for complete search history.

(56) References Cited

U.S. PATENT DOCUMENTS

| | | | |
|---|---|---|---|
| 6,075,842 A | 6/2000 | Engelke et al. | |
| 6,157,705 A | 12/2000 | Perrone | |
| 6,411,800 B1* | 6/2002 | Emerson, III | 455/186.1 |
| 6,430,174 B1* | 8/2002 | Jennings et al. | 370/352 |
| 6,526,385 B1* | 2/2003 | Kobayashi et al. | 704/504 |
| 6,920,425 B1* | 7/2005 | Will et al. | 704/275 |
| 7,013,155 B1* | 3/2006 | Ruf et al. | 455/466 |
| 7,136,478 B1* | 11/2006 | Brand et al. | 379/265.09 |
| 7,881,447 B1* | 2/2011 | Satapathy et al. | 379/202.01 |
| 8,306,811 B2* | 11/2012 | Tewfik et al. | 704/200.1 |
| 2004/0073873 A1* | 4/2004 | Croney et al. | 715/526 |
| 2004/0107015 A1* | 6/2004 | Nimri et al. | 700/94 |
| 2004/0121814 A1 | 6/2004 | Creamer et al. | |
| 2004/0264652 A1 | 12/2004 | Erhart et al. | |
| 2005/0131709 A1* | 6/2005 | Creamer et al. | 704/277 |
| 2005/0213736 A1* | 9/2005 | Rodman et al. | 379/202.01 |
| 2006/0089542 A1* | 4/2006 | Sands | 600/300 |
| 2006/0178115 A1* | 8/2006 | Vayssiere | 455/90.2 |
| 2007/0192820 A1* | 8/2007 | Watanabe et al. | 725/134 |
| 2008/0016142 A1* | 1/2008 | Schneider | 709/203 |
| 2008/0255825 A1* | 10/2008 | Creamer et al. | 704/3 |

(Continued)

FOREIGN PATENT DOCUMENTS

JP 5207164 A 8/1993
JP 11346271 A 12/1999

(Continued)

OTHER PUBLICATIONS

International Search Report—PCT/US07/062823—International Search Authority, European Patent Office—Aug. 6, 2007.

(Continued)

*Primary Examiner* — Simon Sing
*Assistant Examiner* — Solomon Bezuayehu
(74) *Attorney, Agent, or Firm* — Nicholas A. Cole

(57) ABSTRACT

A method of controlling a graphical user interface (GUI) at a wireless device is disclosed and includes storing a set of audio GUI controls at an interactive voice response server and creating an audio GUI control string that is to be communicated to the wireless device within a voice stream. The audio GUI control string corresponds to a text string that is selectably presentable at the wireless device. Further, the method can include embedding the audio GUI control string within the voice stream. Additionally, the method can include transmitting the voice stream with the embedded audio GUI control string to the wireless device.

20 Claims, 8 Drawing Sheets

(56) References Cited

U.S. PATENT DOCUMENTS

| | | | |
|---|---|---|---|
| 2009/0022361 A1* | 1/2009 | Tachibana et al. | 382/100 |
| 2010/0077424 A1* | 3/2010 | Ramaswamy et al. | 725/14 |
| 2011/0197242 A1* | 8/2011 | Koplar | 725/109 |
| 2012/0076288 A1* | 3/2012 | Rodman et al. | 379/202.01 |
| 2012/0297309 A1* | 11/2012 | Robb et al. | 715/738 |

FOREIGN PATENT DOCUMENTS

| | | | |
|---|---|---|---|
| JP | 2001333457 A | 11/2001 |
| JP | 2002078019 A | 3/2002 |
| JP | 2002111873 A | 4/2002 |
| JP | 2002344576 A | 11/2002 |
| JP | 2004128823 A | 4/2004 |

OTHER PUBLICATIONS

Written Opinion—PCT/US07/062823—International Search Authority, European Patent Office—Aug. 6, 2007.

International Preliminary Search Report—PCT/US07/062823—The International Bureau of WIPO, Geneva, Switzerland—Aug. 18, 2008.

* cited by examiner

SYSTEM AND METHOD OF CONTROLLING A GRAPHICAL USER INTERFACE AT A WIRELESS DEVICE

BACKGROUND

I. Field

The present disclosure generally relates to wireless devices. More particularly, the disclosure relates to controlling a graphical user interface within a wireless device.

II. Description of Related Art

Advances in technology have resulted in smaller and more powerful wireless devices. For example, there currently exist a variety of wireless devices, including mobile phones, personal digital assistants (PDAs), laptops, and paging devices that are small, lightweight, and easily carried by users. These devices may include the ability to transmit voice and/or data over wireless networks. Further, many such wireless devices provide significant computing capabilities, and as such, are becoming tantamount to small personal computers and hand-held PDAs.

Typically, these smaller and more powerful wireless devices are often resource constrained. For example, the screen size, the amount of available memory and file system space, and the amount of input and output capabilities may be limited by the small size of the device. Because of such severe resource constraints, it is can be desirable to maintain a limited size and quantity of software applications and other information residing on such wireless devices.

Some of these wireless devices utilize application programming interfaces (APIs) that are sometimes referred to as runtime environments and software platforms. The APIs can be installed onto a wireless device to simplify the operation and programming of such wireless devices by providing generalized calls for device resources. Further, some APIs can provide software developers the ability to create software applications that are executable on such wireless devices. In addition, APIs can provide an interface between a wireless device system hardware and the software applications. As such, the wireless device functionality can be made available to the software applications by allowing the software to make a generic call for a function thus not requiring the developer to tailor its source code to the individual hardware or device on which the software is executing. Further, some APIs can provide mechanisms for secure communications between wireless devices, such as client devices and server systems, using secure cryptographic key information.

Examples of such APIs, some of which are discussed in more detail below, include those currently publicly available versions of the Binary Runtime Environment for Wireless® (BREW®) platform, developed by Qualcomm, Inc. of San Diego, Calif. The BREW® platform can provide one or more interfaces to particular hardware and software features found on wireless devices.

Further, the BREW® platform can be used in an end-to-end software distribution system to provide a variety of benefits for wireless service operators, software developers and wireless device manufacturers and consumers. One such currently available end-to-end software distribution system, called the BREW® solution developed by QUALCOMM Incorporated, includes logic distributed over a server-client architecture, wherein the server can perform billing, security, and application distribution functionality, and wherein the client can perform application execution, security and user interface functionality.

In certain cases, the wireless devices can be used to communicate with servers that interact using interactive voice response applications. For example, a user can use the wireless device to listen to a recorded message that includes a plurality of options. A user can select a desired option and receive another recorded message associated with the selected option. Typically, the user responses to the recorded messages from the interactive voice response application are input via a keypad at the wireless device. For example, a user may select an option by pressing a numerical key on the wireless device keypad. As such, a user has to place the wireless device near his or her ear to listen to the recorded message and then, take the wireless device away from his or her ear in order to respond by pressing a button on the key pad.

Accordingly it would be advantageous to provide an improved system and method of controlling a graphical user interface at a wireless device.

SUMMARY

A method of controlling a graphical user interface (GUI) at a wireless device is disclosed and includes storing a set of audio GUI controls at an interactive voice response server and creating an audio GUI control string that is to be communicated to the wireless device within a voice stream. The audio GUI control string corresponds to a text string that is selectably presentable at the wireless device.

In a particular embodiment, the method includes embedding the audio GUI control string within the voice stream. Further, in another particular embodiment, the method includes receiving a call from the wireless device. In yet another particular embodiment, the method includes transmitting the voice stream with the embedded audio GUI control string to the wireless device.

In a particular embodiment, the set of audio GUI controls includes a plurality of signals. Each of the plurality of signals is a different one of a plurality of selectively audio frequencies and each of the plurality of signals corresponds to a different GUI control at the wireless device. Further, the plurality of selectively audio frequencies includes twenty-six different frequencies and each of the twenty six different frequencies corresponds to a unique alphabetical character that is displayable at the wireless device. Additionally, the plurality of selectively audio frequencies further includes ten different frequencies and each of the ten different frequencies corresponds to a unique numerical character that is displayable at the wireless device.

In another embodiment, a method of controlling a user interface at a wireless device is disclosed and includes creating an audio GUI control string to be embedded within a voice stream. The audio GUI control string corresponds to a text string that is presentable at the user interface at the wireless device. In this embodiment, the method further includes embedding the audio GUI control string within the voice stream.

In yet another embodiment, a method of communicating with an interactive voice response server is disclosed and includes receiving a voice stream and determining whether an audio GUI control string is embedded within the voice stream.

In still another embodiment, a method of communicating with an interactive voice response server is disclosed and includes receiving a query from an interactive voice response server to determine whether a wireless device is controllable via audio GUI controls.

In yet still another embodiment, a communication system is disclosed and includes an interactive voice response server that is remotely coupled to a wireless device. The interactive voice response server includes a processor, a computer readable medium that is accessible to the processor, and a computer program that is embedded within the computer readable medium. The computer program includes instructions to define a set of audio GUI controls, instructions to store the set of audio GUI controls at the computer readable medium, and instructions to create an audio GUI control string to be communicated to with voice data within a voice stream. The audio GUI control string corresponds to a text string to be displayed at the wireless device.

In another embodiment, a communication system is disclosed and an interactive voice response server to receive calls from a wireless device. The interactive voice response server includes a processor, a computer readable medium that is accessible to the processor, and a computer program that is embedded within the computer readable medium. The computer program includes instructions to create an audio GUI control string to be communicated to with voice data within a voice stream. The audio GUI control string corresponds to a text string to be displayed at the wireless device. Additionally, the computer program includes instructions to embed the audio GUI control string within the voice stream.

In yet another embodiment, a wireless device is disclosed and includes a processor, a display that is responsive to the processor, and a computer readable medium that is accessible to the processor. A computer program is embedded within the computer readable medium and includes instructions to present a GUI at the display, wherein the GUI is controllable via one or more audio GUI controls received at the wireless device over a voice channel.

In still another embodiment, a wireless device is disclosed and includes a processor and, a computer readable medium that is accessible to the processor. A computer program is embedded within the computer readable medium and includes instructions to receive a query from an interactive voice response server to determine whether the wireless device is controllable via audio GUI controls.

In still yet another embodiment, a computer program that is embedded within a computer readable medium is disclosed and includes instructions to define a set of audio GUI controls, instructions to store the set of audio GUI controls at an interactive voice response server, and instructions to create an audio GUI control string that corresponds to voice data to be communicated over a voice stream. The audio GUI control string corresponds to a text string that is selectively displayable at a wireless device.

In another embodiment, a computer program that is embedded within a computer readable medium is disclosed and includes instructions to create an audio GUI control string that corresponds to voice data of a voice stream. The audio GUI control string corresponds to a text string that is selectively displayable at a wireless device. Moreover, the computer program includes instructions to embed the audio GUI control string within the voice stream.

In still another embodiment, a computer program that is embedded within a computer readable medium is disclosed and includes instructions to receive a voice stream and instructions to determine whether an audio GUI control string is embedded within the voice stream.

In yet another embodiment, an interactive voice response server is disclosed and includes means for defining a set of audio GUI controls, means for storing the set of audio GUI controls at an interactive voice response server, and means for creating an audio GUI control string that corresponds to voice data within a voice stream. The audio GUI control string corresponds to a text string that is selectively displayable at a wireless device.

In another embodiment, an interactive voice response server is disclosed and includes means for creating an audio GUI control string that corresponds to voice data within a voice stream. The audio GUI control string corresponds to a text string that is selectively displayable at a wireless device. The interactive voice response server further includes means for embedding the audio GUI control string within the voice stream.

In still yet another embodiment, a wireless device is disclosed and includes means for receiving a voice stream and means for determining whether an audio GUI control string is embedded within the voice stream.

In another embodiment, a wireless device is disclosed and includes means for receiving a query from the interactive voice response server to determine whether the wireless device is controllable via audio GUI controls.

An advantage of one or more of embodiments disclosed herein can include allowing visual interaction with an interactive voice response server.

Another advantage can include controlling a GUI via one or more audio GUI controls.

Still another advantage can include presenting text at a GUI that corresponds to voice data received via a voice stream.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

The word "exemplary" is used herein to mean "serving as an example, instance, or illustration." Any embodiment described herein as "exemplary" is not necessarily to be construed as preferred or advantageous over other embodiments. Further, many embodiments are described in terms of sequences of actions to be performed by, for example, elements of a wireless device. It will be recognized that various actions described herein could be performed by specific circuits, e.g., application specific integrated circuits (ASICs), by program instructions being executed by one or more processors, or by a combination of both.

Further, the embodiments described herein can additionally be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform a certain action or "code operable to" perform the described action. The following detailed description describes methods, systems, software and apparatus used in connection with one or more wireless devices.

In one or more embodiments, a wireless device may utilize a runtime environment, such as a version of the Binary Runtime Environment for Wireless® (BREW®) platform developed by QUALCOMM, Inc., of San Diego, Calif. In at least one embodiment in the following description, the system used to provide communications between wireless devices and servers is implemented on a wireless device executing a runtime environment, such as the current version of the BREW® platform. However, one or more embodiments of the system used to provide communications between wireless devices and servers are suitable for use with other types of runtime environments that, for example, operate to control the execution of applications on wireless devices.

Figure 1:
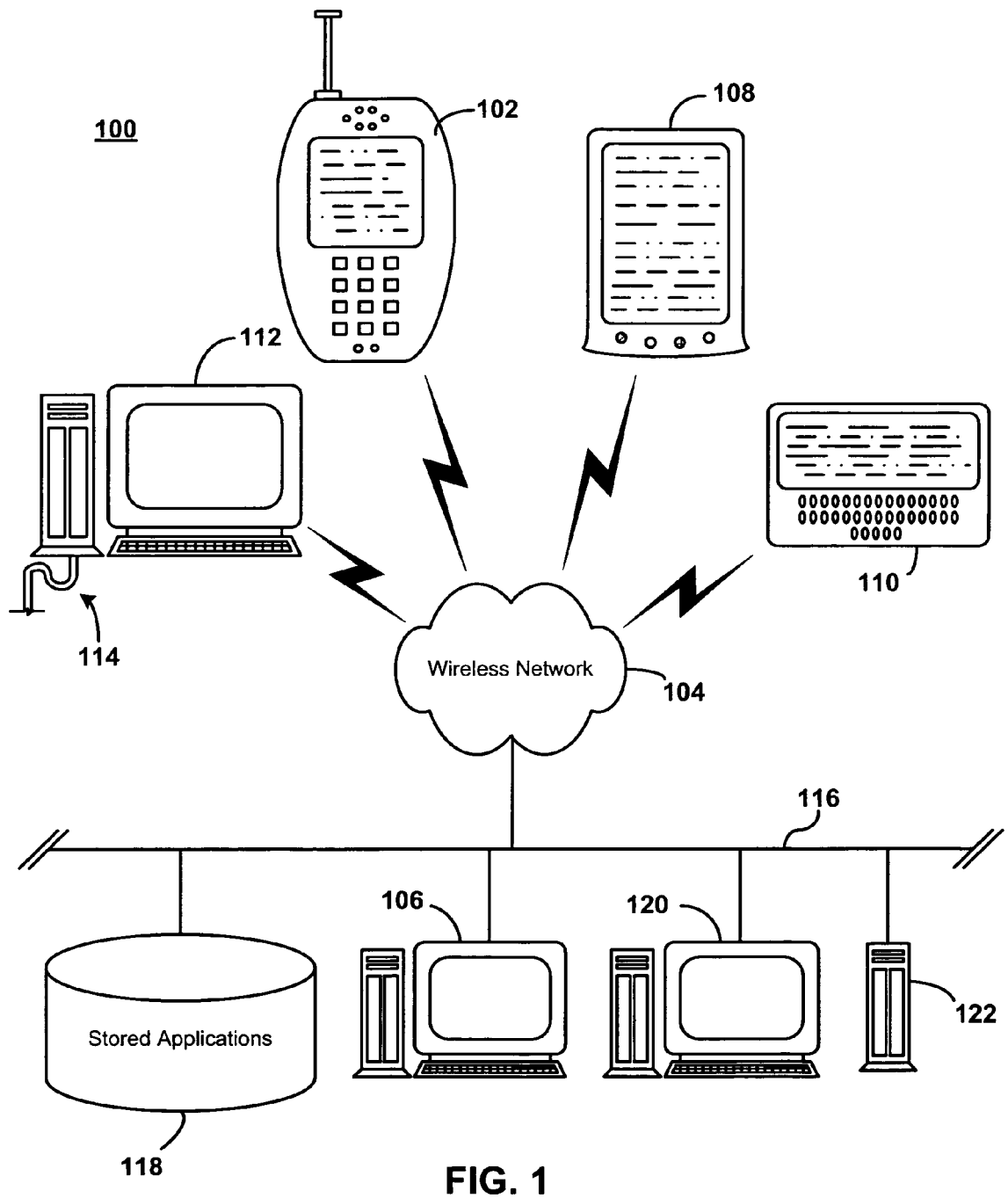
FIG. 1 is a general diagram of a particular embodiment of a system providing communications between a wireless device and a server.

FIG. 1 illustrates a block diagram of an exemplary, non-limiting embodiment of a system 100 that may perform loading, reloading, and deletion of software application components on a wireless device, such as wireless telephone 102. The wireless telephone 102 communicates across a wireless network 104 with at least one application server 106. Further, the application server 106 can selectively transmit one or more software applications and components to one or more wireless devices across a wireless communication portal or other node having data access to the wireless network 104.

As illustrated in FIG. 1, the wireless device can be a wireless telephone 102, a personal digital assistant 108, a pager 110, or a separate computer platform 112 that has a wireless communication portal. In a particular embodiment, the pager 110 can be a two-way text pager. Further, in an alternative embodiment, the wireless device can have a wired connection 114 to a network or the Internet. The exemplary, non-limiting system can include any form of a remote module including a wireless communication portal, including without limitation, wireless modems, PCMCIA cards, personal computers, access terminals, telephones with or without a display or keypad, or any combination or sub-combination thereof.

As depicted in FIG. 1, the application download server 106 is coupled to a network 116 with other computer elements in communication with the wireless network 104. The system 100 includes a second server 120 and a stand-alone server 122, and each server can provide separate services and processes to the wireless devices 102, 108, 110, 112 across the wireless network 104. Further, as indicated in FIG. 1, the system 100 also includes at least one stored application database 118 that stores software applications that are downloadable by the wireless devices 102, 108, 110, 112. Different embodiments are contemplated that locate logic to perform secure communications at any one or more of the application download server 106, the second server 120 and the stand-alone server 122.

Figure 2:
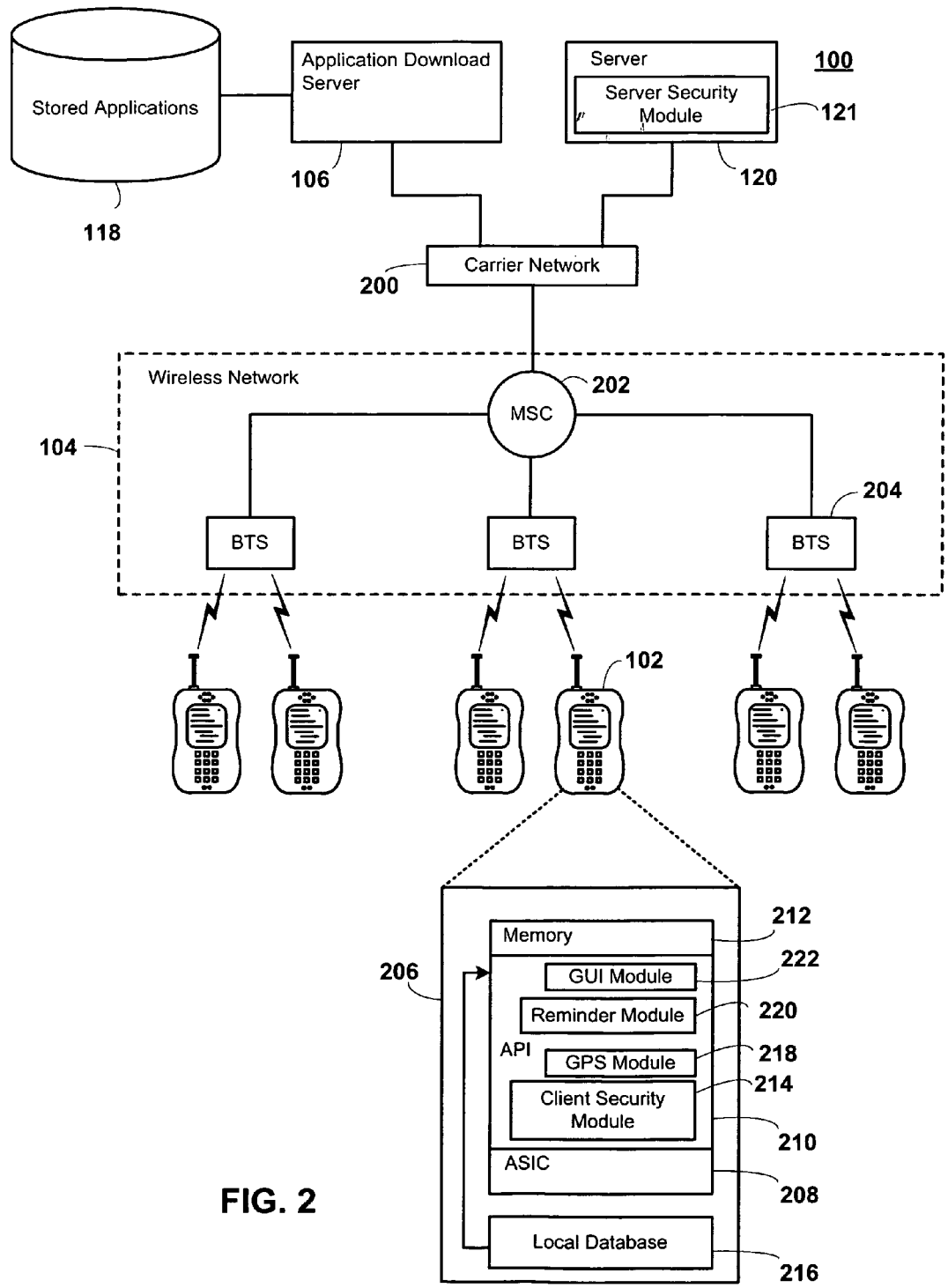
FIG. 2 is a general diagram that illustrates further details of the particular embodiment of the system of FIG. 1.

In FIG. 2, a block diagram is shown that more fully illustrates the system 100, including the components of the wireless network 104 and interrelation of the elements of the system 100. The system 100 is merely exemplary and can include any system whereby remote modules, such as the wireless devices 102, 108, 110, 112 communicate over-the-air between and among each other and/or between and among components connected via a wireless network 104, including, without limitation, wireless network carriers and/or servers. The application download server 106 and the stored application database 118, along with any other servers, such as server 120, are compatible with wireless communication services and can communicate with a carrier network 200 through a data link, such as the Internet, a secure LAN, WAN, or other network. In an illustrative embodiment, the server 120 contains a server security module 121 that further contains logic configured to provide for secure communications over the carrier network 200. In a particular embodiment, the server security module 121 can operate in conjunction with a client security module located on a wireless device, such as wireless devices 102, 108, 110, 112, to provide secure communications.

The carrier network 200 controls messages (sent as data packets) sent to a mobile switching center ("MSC") 202. The carrier network 200 communicates with the MSC 202 by a network, such as the Internet and/or POTS ("plain ordinary telephone system"). Typically, the network connection between the carrier network 200 and the MSC 202 transfers data, and the POTS network transfers voice information. The MSC 202 is connected to multiple base transceiver stations ("BTS") 204. The MSC 202 can be connected to the BTS 204 by both a data network for data transfer and POTS for voice information. The BTS 204 ultimately broadcasts messages wirelessly to the wireless devices, such as to wireless telephone 102, by the short messaging service ('SMS"), or other over-the-air methods known in the art.

The wireless device 102 has a computer platform 206 that can receive and execute software applications transmitted from the application download server 106. The computer platform 206 may be implemented as an application-specific integrated circuit ("ASIC" 208), a processor, microprocessor, logic circuit, or other data processing device. The ASIC 208 is installed at the time of manufacture of the wireless device. The ASIC 208 or other processor can execute an application programming interface ("API") 210 layer that interfaces with resident programs in the memory 212 of the wireless device. The memory 212 can be comprised of read-only or random-access memory (ROM or RAM), EEPROM, flash memory, or any other memory suitable for computer platforms.

The API 210 also includes a client security module 214 containing logic configured to provide for secure communications over the carrier network 200. In a particular embodiment, the client security module 214 can operate in conjunction with the server security module 121 to provide secure communications. As illustrated in FIG. 2, the computer platform 206 can further include a local database 216 that can hold applications not actively used in memory 212. In an illustrative embodiment, the local database 216 is stored within a flash memory cell, but it can be stored within any secondary storage device as known in the art, such as magnetic media, EEPROM, optical media, tape, or floppy or hard disk.

A wireless device, e.g., the wireless telephone 102, can download one or more software applications, such as games, news, stock monitors, and the like, from the application download server 106. Further, the wireless device can store the downloaded applications in the local database 216, when not in use, and can load stored resident applications from the local database 216 to memory 212 for execution by the API 210 when desired by the user. Further, communications over the wireless network 104 may be performed in a secure manner, at least in part, due to the interaction and operation of the client security module 214 and the server security module 121. As shown in FIG. 2, the API 210 can also include a global positioning system (GPS) module 218 and a reminder module 220. Further, the API 210 can include a graphical user interface (GUI) module 222. In a particular embodiment, the GUI module 222 can cause a GUI to be displayed at the display of a wireless device 102. Further, the GUI module 222 can receive one or more audio GUI controls and apply those controls to the GUI in order to control the GUI.

Figure 3:
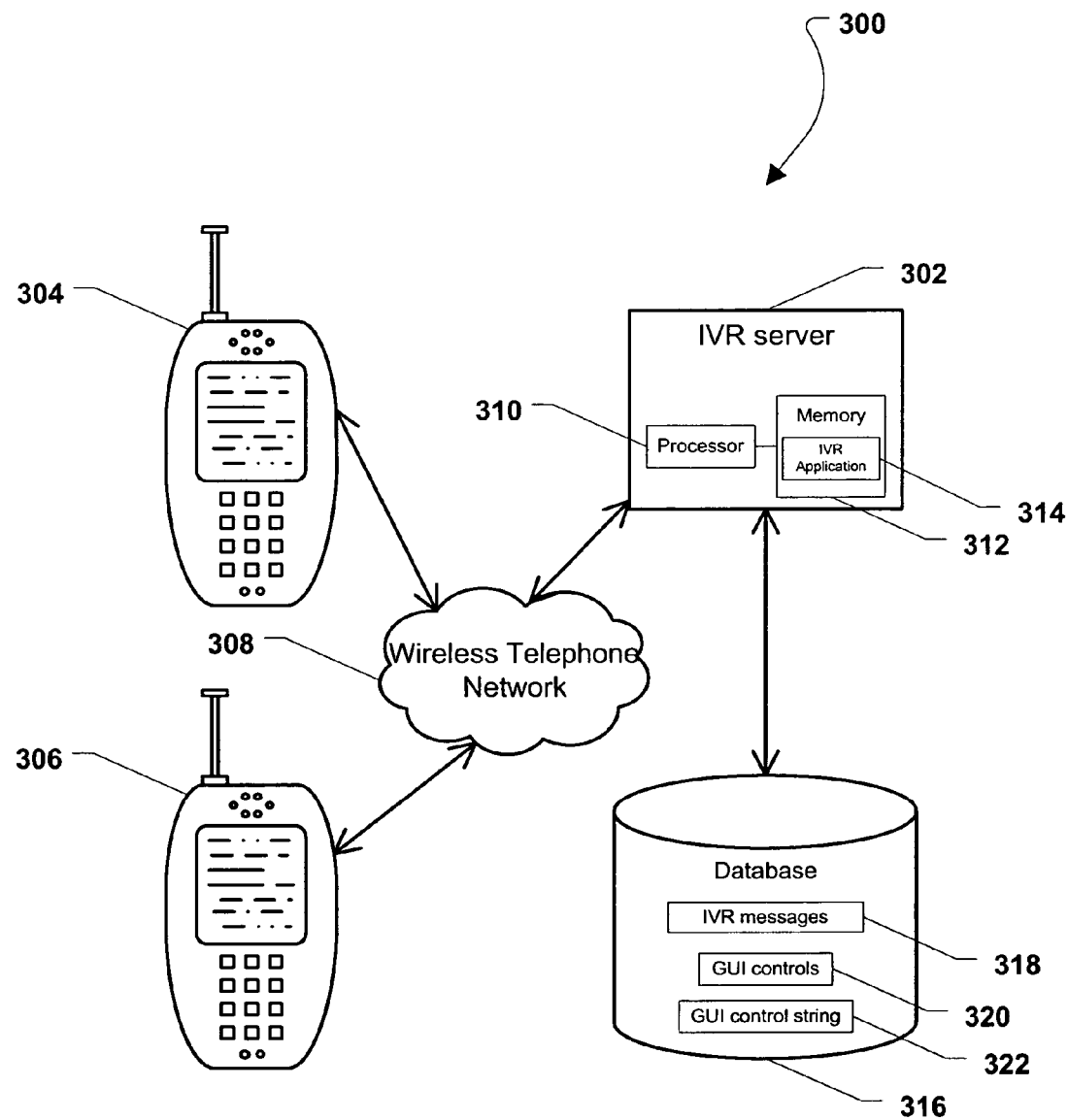
FIG. 3 is a general diagram of a system of downloading applications to wireless devices.

FIG. 3 depicts a communication system, generally designated 300. As illustrated, the system 300 includes an interactive voice response (IVR) server 302. Additionally, as shown in FIG. 3, a first wireless device 304 and a second wireless device 306 can communicate with the interactive voice response server and each other via a wireless telephone network 308. In a particular embodiment, the wireless devices 304, 306 are the wireless devices 102 described above in conjunction with FIG. 1 and FIG. 2. In a particular embodiment, the interactive voice response server 302 can transmit a voice stream to each wireless device 304, 306. In a particular embodiment, the voice stream can include voice data and an embedded audio graphical user interface (GUI) control string.

Additionally, in a particular embodiment, either wireless device 304, 306 can decode the voice data within the voice stream and transmit the voice data to a user via a speaker within the wireless device 304, 306. Further, either wireless device 304, 306 can decode the audio GUI control string and apply the controls within the GUI control string to a graphical user interface within the wireless device 304, 306. In an illustrative embodiment, the GUI control string can cause the GUI within the wireless device 304, 306 to create a text message at the wireless device 304, 306 that corresponds to the voice message within the voice data.

As illustrated in FIG. 3, the interactive voice response server 302 can include a processor 310 and a computer readable medium 312, e.g., a memory, that is accessible to the processor 312. In a particular embodiment, a computer program, e.g., an IVR application 314, can be embedded within the computer readable medium 312 and can be used to provide a voice stream to the wireless devices 304, 306. More particularly, when either wireless device 304, 306 initiates communication with the interactive voice response server 302 the wireless device 304, 306 can perform a "handshake" with the interactive voice response server 302 in order to determine the audio GUI controls defined by the interactive voice response server 302. Further, during the "handshake," the interactive voice response server 302 can query the wireless device 304, 306 in order to ascertain whether the wireless device 304, 306 can be controlled via the audio GUI controls defined by the interactive voice response server 302.

FIG. 3 further indicates that the interactive voice response server 302 can be coupled to a database 316. The database 316 can include one or more interactive voice response messages 318 that can be transmitted to a user based on one or more user inputs. Further, the database 316 can include one or more audio GUI controls 320 and one or more GUI control strings 322. In a particular embodiment, the audio GUI controls 320 can be used to control a GUI at a wireless device. Further, the GUI control strings 322 include one or more audio GUI controls 320 and correspond to one or more text messages that can be presented at a wireless device in conjunction with the IVR voice messages 318. For example, a GUI control string may include a series of audible, or slightly audible, signals that can cause a GUI to present a message that corresponds to an IVR voice message, such as "You have voice mail."

Figure 4:
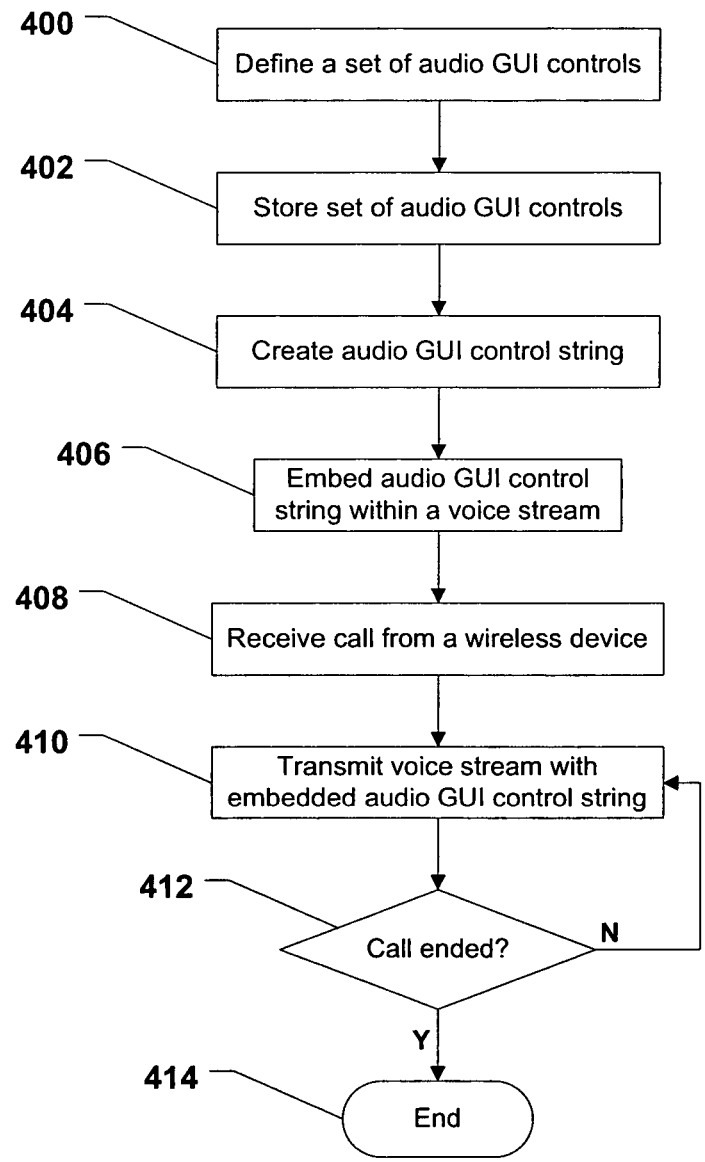
FIG. 4 is a flow chart illustrating a method of controlling a graphical user interface at a wireless device.

Referring to FIG. 4, a method of controlling a GUI is shown and commences at block 400. At block 400, a set of audio GUI controls is defined at an interactive voice response server. In a particular embodiment, the set of audio GUI controls include a plurality of audio signals. Further, in a particular embodiment, each of the plurality of audio signals are at a different one of a plurality of selectable audio frequencies and each of the plurality of audio signals corresponds to a different control at the wireless device.

In another particular embodiment, the plurality of audio frequencies includes twenty-six different frequencies and each of the twenty six different frequencies corresponds to a different alphabetical character that can be displayed at the wireless device. Additionally, the plurality of audio frequencies can further include ten different frequencies and each of the ten different frequencies corresponds to a different numerical character that can be displayed at the wireless device. Moreover, the plurality of audio frequencies can include other frequencies that can cause the pixels of a graphical user interface to turn on and off in response to the frequencies.

Proceeding to block 402, the audio GUI controls are stored at a memory within at the interactive voice response server. At block 404, the interactive voice response server creates an audio GUI control string that corresponds to a voice message that can be transmitted by the interactive voice response server to a wireless device after the wireless device calls the interactive voice response server. Next, at block 406, the interactive voice response server embeds the audio GUI control string within a voice stream that can be transmitted to a wireless device.

Moving to block 408, the interactive voice response server receives a call from a wireless device. At block 410, the interactive voice response server transmits a voice stream that includes encoded voice data and the embedded audio GUI control string. Continuing to decision step 412, the interactive voice response server determines whether the call has ended. If the call has ended, the method ends at state 414. Otherwise, if the call has not ended the method returns to block 410 and continues as described herein.

Figure 5:
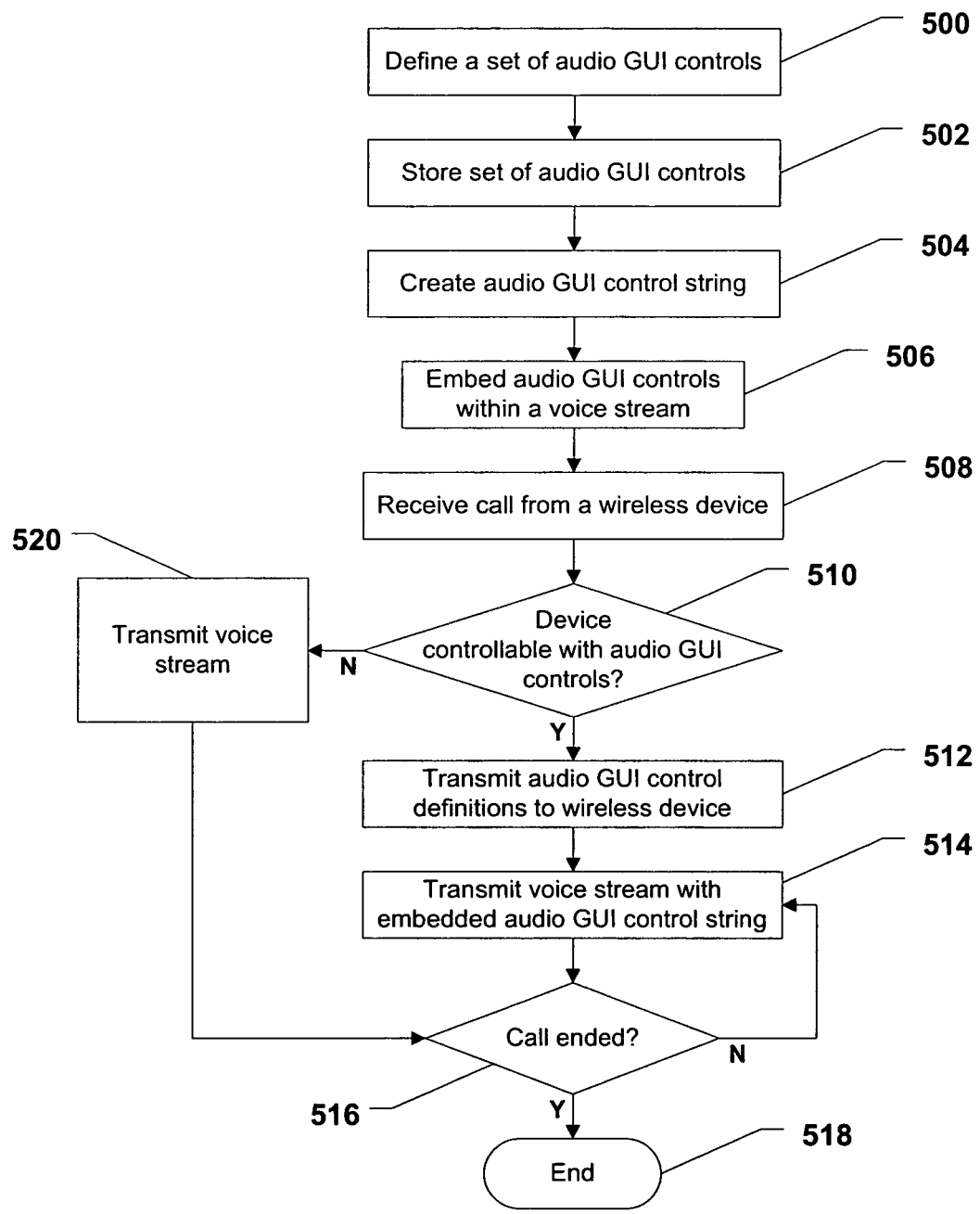
FIG. 5 is a flow chart illustrating an alternative method of controlling a graphical user interface at a wireless device.

FIG. 5 depicts an alternative method of controlling a GUI. Beginning at block 500, a set of audio GUI controls is defined at an interactive voice response server. At block 502, the audio GUI controls are stored at a memory within at the interactive voice response server. Moving to block 504, the interactive voice response server creates an audio GUI control string that corresponds to a voice message that can be transmitted by the interactive voice response server to a wireless device after the wireless device calls the interactive voice response server. Next, at block 506, the interactive voice response server embeds the audio GUI control string within a voice stream that can be transmitted to a wireless device.

Moving to block 508, the interactive voice response server receives a call from a wireless device. Thereafter, at decision step 510, the interactive voice response server determines whether the wireless device is controllable using audio GUI controls. For example, the interactive voice response server can query the wireless device in order to determine whether the wireless device can be controlled with the audio GUI controls.

If the wireless device can be controlled using audio GUI controls, the method proceeds to block 512 and the interactive voice response server transmits the audio GUI control definitions to the wireless device. Thereafter, at block 514, the interactive voice response server transmits a voice stream to the wireless device that includes encoded voice data and an audio GUI control string. In a particular embodiment, the step depicted in block 512 can be an optional step. In other words, the interactive voice response server can transmit the audio GUI control string without transmitting the audio GUI control definitions. Continuing to decision step 516, the interactive voice response server determines whether the call has ended. If the call has ended, the method ends at state 518. Otherwise, if the call has not ended the method returns to block 514 and continues as described herein.

Returning to decision step 510, if the wireless device cannot be controlled using audio GUI controls, the method moves to block 520 and the interactive voice response server transmits a voice stream with encoded voice data to the wireless device. Then, the method then proceeds to decision step 516 and continues as described herein.

Figure 6:
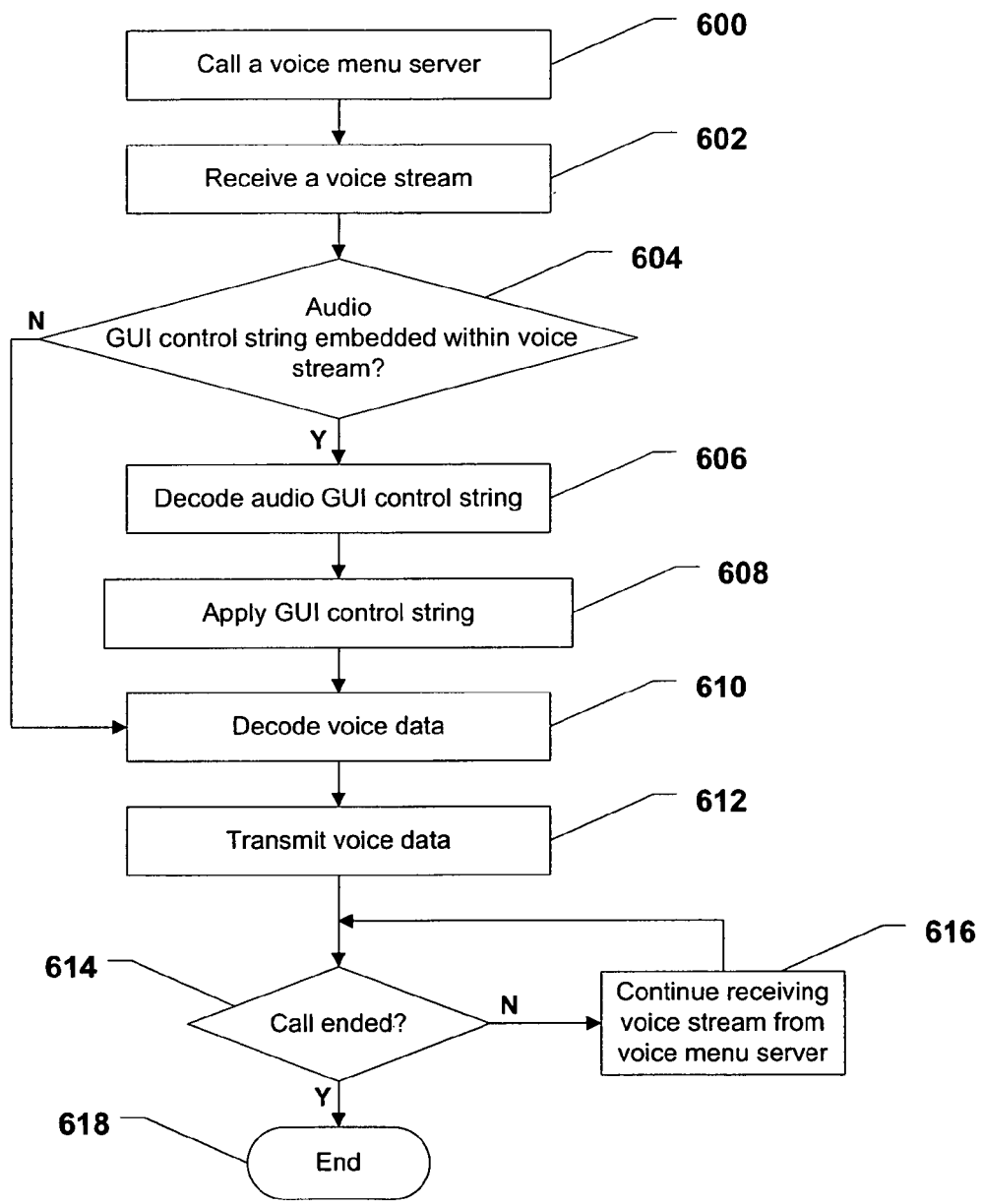
FIG. 6 is a flow chart illustrating another alternative method of controlling a graphical user interface at a wireless device.

Referring to FIG. 6, another alternative method of controlling a GUI is shown and commences at block 600. At block 600, a wireless device calls an interactive voice response server. Next, at block 602, the wireless device receives a voice stream. Moving to decision step 604, the wireless device determines whether an audio GUI control string that includes one or more audio GUI controls is embedded within the voice stream. If so, the method proceeds to block 606 and the wireless device decodes the audio GUI control string. Thereafter, at block 608, the wireless device applies the audio GUI control string to the GUI within the wireless device. Then, the method proceeds to block 610.

Returning to decision step 604, if an audio GUI control string is not embedded within the voice stream, the method proceeds to block 610 and the wireless device decodes encoded voice data within the voice stream. At block 612, the wireless device transmits the voice data to a user of the wireless device via a speaker incorporated within the wireless device. Proceeding to decision step 614, the wireless device determines whether the call has ended. If the call has not ended, the method proceeds to block 616 and the wireless device continues to receive the voice stream from the interactive voice response server. On the other hand, if the call has ended the method ends at state 618.

Figure 7:
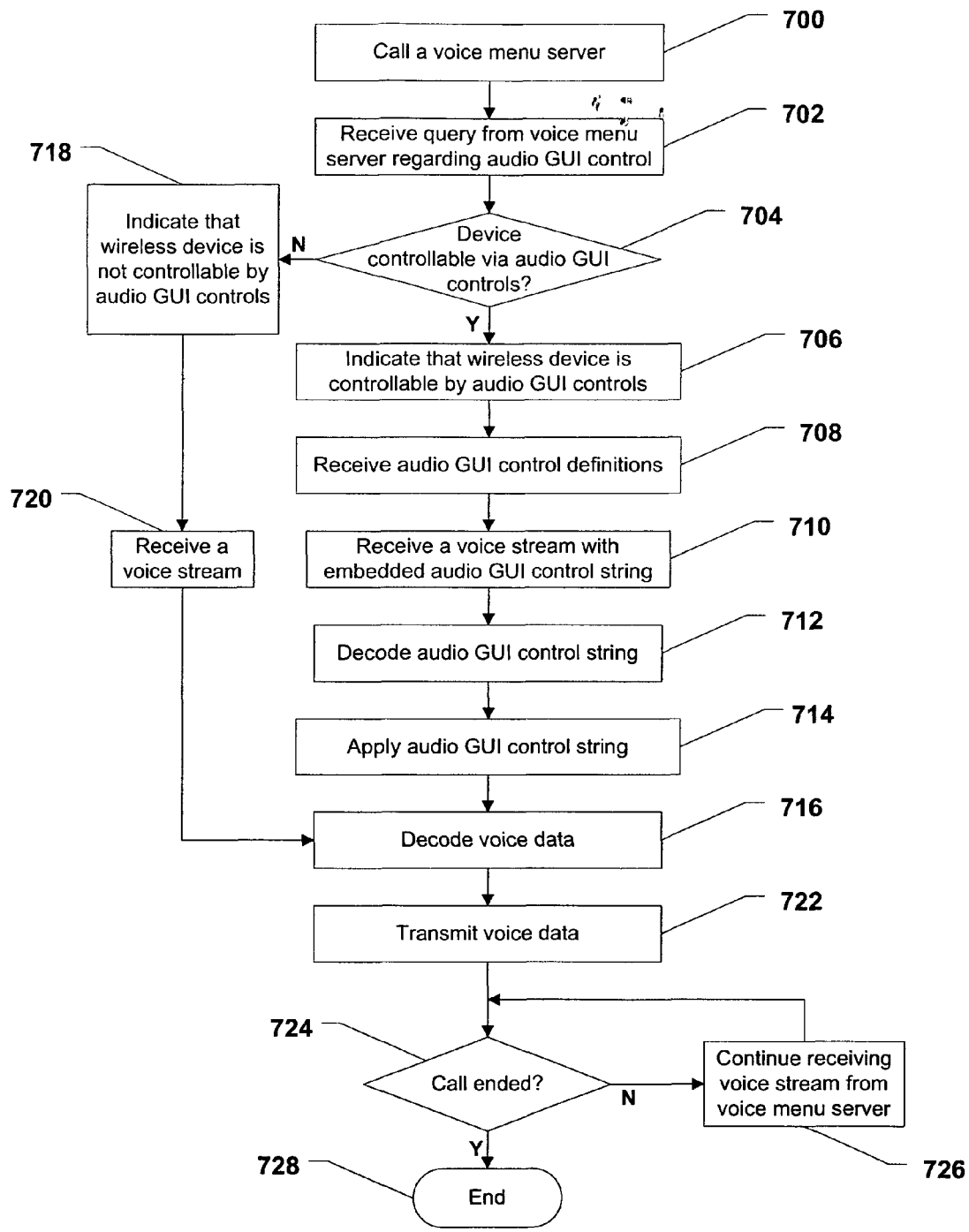
FIG. 7 is a flow chart illustrating a method of yet another method controlling a graphical user interface at a wireless device.

FIG. 7 illustrates yet another method of controlling a GUI. At block 700, a wireless device calls an interactive voice response server. Next, at block 702, the wireless device receives a query from an interactive voice response server regarding whether the wireless device can be control using one or more audio GUI controls. Moving to decision step 704, the wireless device determines whether it can be controlled by audio GUI controls. If the wireless device can be controlled by audio GUI controls, the method proceeds to block 706 and the wireless device indicates to the interactive voice response server that the wireless device is controllable by audio GUI controls.

Moving to block 708, the wireless device receives the audio GUI control definitions from the interactive voice response server. At block 710, the wireless device receives a voice stream from the interactive voice response server. In a particular embodiment, the voice stream includes voice data and an embedded audio GUI control string. Continuing to block 712, the wireless device decodes the audio GUI control string based on the previously received definitions. Then, at block 714, the wireless device applies the audio GUI control string to a GUI within the wireless device. The method then moves to block 716.

Returning to decision step 704, if the wireless device cannot be controlled by audio GUI controls, the method proceeds to block 718 and the wireless device indicates to the interactive voice response server that the wireless device cannot be controlled by audio GUI controls. Next, at block 720, the wireless device receives a voice stream from the interactive voice response server. In a particular embodiment, the voice stream includes voice data. The method then proceeds to block 716.

At block 716, the wireless device decodes the voice data within the voice stream. Then, at block 722, the wireless device transmits the voice data to a user, e.g., using a speaker incorporated in the wireless device. Proceeding to decision step 724, the wireless device determines whether the call has ended. If the call has not ended, the method proceeds to block 726 and the wireless device continues to receive the voice stream from the interactive voice response server. On the other hand, if the call has ended the method ends at state 728.

Figure 8:
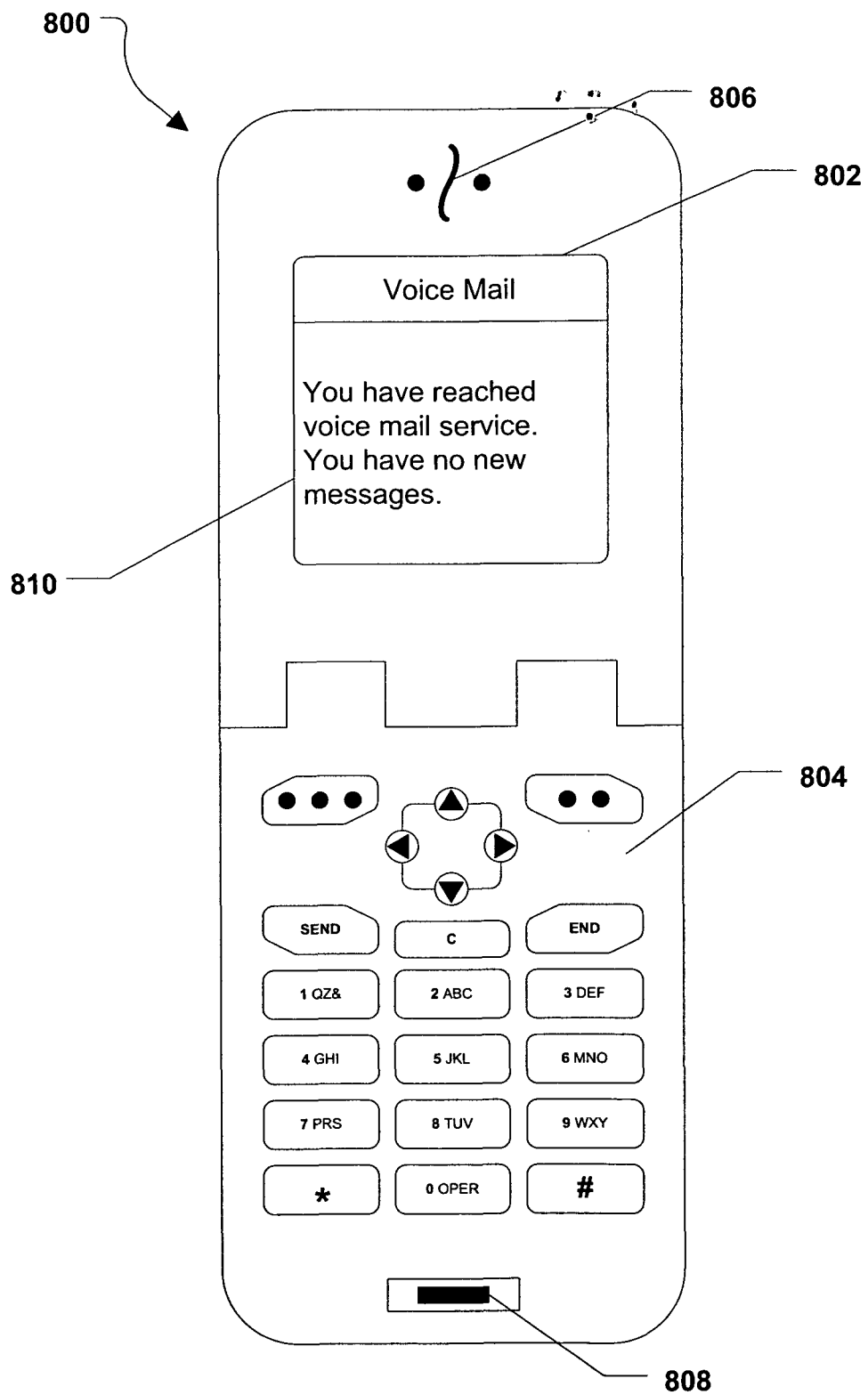
FIG. 8 is a diagram of a wireless device having a graphical user interface.

Referring to FIG. 8, a wireless device is shown and is generally designated 800. As shown, the wireless device 800 includes a display 802 and a keypad 804. Further, the wireless device 800 includes a speaker 806 and a microphone 808. Additionally, the wireless device 800 can include a text display area 810 within the display 802.

In a particular embodiment, as a voice stream is received at the wireless device 800, voice data can be decoded and transmitted to a user via the speaker 806. Also, an embedded audio GUI control string can be decoded and text that corresponds to the audio GUI control string can be presented within the text display area 810 within the display 802. For example, when a user communicates with a voice mail server, e.g., to get voice mail messages, a recorded message can be transmitted to the user. Further, as the recorded message is transmitted to the user, a text message corresponding to the recorded message can be presented to the user. As an example, the text message can indicate, "You have reached voice mail service. You have no new messages." Alternatively, the text message can prompt the user for an input, e.g., "To listen to old messages, press one."

With the configuration of structure disclosed herein, the system and method can allow a user of a wireless device to interact with an interactive voice response server via a graphical user interface. A voice stream transmitted by the interactive voice response server can include an embedded audio GUI control string that can cause the graphical user interface to display a text message that corresponds to a recorded message within the voice stream. Accordingly, a user can more efficiently navigate within an interactive voice response without having to listen to the interactive voice response.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a wireless device or a user terminal. In the alternative, the processor and the storage medium may reside as discrete components in a wireless device or user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features as defined by the following claims.

What is claimed is:

1. A method of communicating with an interactive voice response server, the method comprising:
    receiving a voice stream from the interactive voice response server with a wireless device, wherein the voice stream includes at least one of voice data and an embedded audio graphical user interface (GUI) control string;
    determining at the wireless device whether an audio GUI control string is embedded within the voice stream,
    wherein the audio GUI control string corresponds to a recorded voice message within the voice stream, and wherein:
        the audio GUI control string comprises a plurality of signals generated automatically at the interactive voice response server;
        each of the plurality of signals is a different one of a plurality of selectively audio frequencies; and
        each of the plurality of audio frequencies corresponds to a different GUI control at the wireless device;
    wherein, if it is determined at the wireless device that an audio GUI control string is embedded within the voice stream, then decoding the embedded audio GUI control string found in the voice stream, and
    wherein, if it is determined at the wireless device that an audio GUI control string is not embedded within the voice stream, then decoding and transmitting the voice data.

2. The method of claim 1, wherein the voice stream is received from an interactive voice response server.

3. The method of claim 1, further comprising decoding an embedded audio GUI control string found in the voice stream.

4. The method of claim 3, further comprising applying the embedded audio GUI control string to a graphical user interface (GUI) at the wireless device.

5. The method of claim 4, further comprising decoding an embedded and recorded voice message found within the voice stream, wherein the embedded and recorded voice message corresponds to the embedded audio GUI control string.

6. The method of claim 5, further comprising transmitting the embedded and recorded voice message via a speaker.

7. A method of communicating with an interactive voice response server, the method comprising:
    receiving at a wireless device a query from an interactive voice response server to determine whether the wireless device is controllable via audio GUI controls;
    receiving a voice stream at the wireless device, wherein the voice stream includes at least one of recorded voice data and an embedded audio GUI control string, the embedded audio GUI control string comprises a plurality of signals generated automatically at the interactive voice response server; each of the plurality of signals is a different one of a plurality of selectively audio frequencies; and each of the plurality of audio frequencies corresponds to a different GUI control at the wireless device; and
    determining at the wireless device whether an audio GUI control string is embedded within the voice stream,
    wherein, if it is determined at the wireless device that an audio GUI control string is embedded within the voice stream, then decoding the embedded audio GUI control string found in the voice stream, and
    wherein, if it is determined at the wireless device that an audio GUI control string is not embedded within the voice stream, then decoding and transmitting the recorded voice data.

8. The method of claim 7, further comprising receiving audio GUI control definitions prior to receiving the voice stream with the embedded audio GUI control string.

9. The method of claim 7, further comprising decoding the embedded audio GUI control string.

10. The method of claim 9, further comprising applying the decoded audio GUI control string to a graphical user interface (GUI) at the wireless device.

11. The method of claim 10, further comprising decoding the embedded and recorded voice data from the voice stream.

12. The method of claim 11, further comprising transmitting the decoded voice data via a speaker.

13. A method of communicating with an interactive voice response server, the method comprising:
    receiving a query at a wireless device from an interactive voice response server to determine whether the wireless device is controllable via audio GUI controls;
    receiving a voice stream, wherein the voice stream includes at least one of recorded voice data and an embedded audio GUI control string, the audio GUI control string comprises a plurality of signals generated automatically at the interactive voice response server; each of the plurality of signals is a different one of a plurality of selectively audio frequencies; and each of the plurality of audio frequencies corresponds to a different GUI control at the wireless device;
    decoding the audio GUI control string if it is determined at the wireless device that an audio GUI control string is embedded within the voice stream;
    applying the decoded audio GUI control string to a GUI at the wireless device; and
    decoding the recorded voice data from the voice stream, wherein the audio GUI control string causes the GUI within the wireless device to present a text string corresponding to the recorded voice data.

14. A wireless device, comprising:
    a processor;
    a display responsive to the processor;
    a computer readable medium accessible to the processor; and
    a computer program embedded within the computer readable medium, the computer program comprising:
        instructions to present a graphical user interface (GUI) at the display, wherein the GUI is controllable via one or more audio GUI controls received at the wireless device over a voice channel, wherein the voice channel includes at least one of voice data and embedded audio graphical user interface (GUI) controls;

instructions for determining whether audio GUI controls are embedded within the voice channel, wherein, if it is determined that audio GUI controls are embedded within the voice channel, then decoding the embedded audio GUI controls found in the voice channel, and wherein, if it is determined that audio GUI controls string are not embedded within the voice channel, then decoding and transmitting the voice data and instructions to play one or more recorded voice messages at the wireless devices, wherein at least some of the one or more recorded voice messages correspond to the one or more audio GUI controls, wherein the one or more recorded voice messages are received at the wireless device over the voice channel, and wherein:

the audio GUI control string comprises a plurality of signals generated automatically at the interactive voice response server;

each of the plurality of signals is a different one of a plurality of selectively audio frequencies; and each of the plurality of audio frequencies corresponds to a different GUI control at the wireless device.

15. The wireless device of claim 14, wherein the computer program embedded within the computer readable medium further comprises:

instructions to receive a query from an interactive voice response server to determine whether the wireless device is controllable via audio GUI controls.

16. The method of claim 6, wherein transmitting the embedded and recorded voice message via a speaker is performed conjunctively with applying the embedded audio GUI control string to a GUI at the wireless device.

17. The method of claim 7, wherein the recorded voice data comprises a recorded message of speech produced by an operator using a phone.

18. The method of claim 11, wherein the embedded audio GUI control string causes the GUI at the wireless device to present a text string corresponding to the embedded and recorded voice data.

19. The wireless device of claim 14, wherein the computer program further comprises:

instructions to play the one or more recorded voice messages in conjunction with presenting text messages in the GUI at the display, wherein the text messages correspond to the one or more audio GUI controls.

20. The method of claim 13, wherein the recorded voice data comprises a recorded message of speech produced by an operator using a phone.

* * * * *